United States Patent
Jiang et al.

(10) Patent No.: US 9,098,913 B2
(45) Date of Patent: Aug. 4, 2015

(54) PREDICTION OF SUCCESSFUL GRASPS BY END OF ARM TOOLING

(71) Applicant: Cornell University, Ithaca, NY (US)

(72) Inventors: Yun Jiang, Ithaca, NY (US); John R. Amend, Jr., Ithaca, NY (US); Hod Lipson, Ithaca, NY (US); Ashutosh Saxena, Ithaca, NY (US); Stephen Moseson, Seattle, WA (US)

(73) Assignee: Cornell University, Ithaca, NY (US)

( * ) Notice: Subject to any disclaimer, the term of this patent is extended or adjusted under 35 U.S.C. 154(b) by 155 days.

(21) Appl. No.: 13/893,147

(22) Filed: May 13, 2013

(65) Prior Publication Data

US 2014/0016856 A1    Jan. 16, 2014

Related U.S. Application Data

(60) Provisional application No. 61/646,053, filed on May 11, 2012.

(51) Int. Cl.
*G06T 7/00* (2006.01)
*G06T 7/40* (2006.01)

(52) U.S. Cl.
CPC .................. *G06T 7/0081* (2013.01); *G06T 7/40* (2013.01); *G06T 2207/10024* (2013.01); *G06T 2207/10028* (2013.01); *G06T 2207/30164* (2013.01)

(58) Field of Classification Search
CPC ... G06T 7/0081; G06T 7/0075; G06T 7/2033; G06T 7/20; G06K 9/00771
USPC .................................. 382/153, 103, 128, 190
See application file for complete search history.

(56) References Cited

U.S. PATENT DOCUMENTS

| | | | |
|---|---|---|---|
| 8,965,104 B1* | 2/2015 | Hickman et al. | 382/153 |
| 2011/0050852 A1* | 3/2011 | Lamprecht et al. | 348/43 |
| 2013/0156262 A1* | 6/2013 | Taguchi et al. | 382/103 |

OTHER PUBLICATIONS

Jiang et al: "Efficient grasping from RGBD images: Learning using a new rectangle representation", 2011 IEEE Intl. conf. on Robotics and Automation, May 9, 2011.*

* cited by examiner

*Primary Examiner* — Ruiping Li
(74) *Attorney, Agent, or Firm* — Valaukas Corder LLC

(57) ABSTRACT

Given an image and an aligned depth map of an object, the invention predicts the 3D location, 3D orientation and opening width or area of contact for an end of arm tooling (EOAT) without requiring a physical model.

11 Claims, 3 Drawing Sheets

PREDICTION OF SUCCESSFUL GRASPS BY END OF ARM TOOLING

CROSS-REFERENCE TO RELATED APPLICATION

This application claims the benefit of U.S. Provisional Application No. 61/646,053 filed May 11, 2012.

FIELD OF THE INVENTION

The invention relates generally to robotics. More specifically, the invention relates to predicting grasps of an end of arm tooling, for example a two-fingered gripper, a three-fingered gripper, a jamming gripper or parallel plate gripper, without requiring a physical model.

BACKGROUND OF THE INVENTION

Robotics pertains to automated machines that take the place of humans in a variety of applications, for example, medical, manufacturing, and military. Typically, robots are guided by a computer program or electronic circuitry to provide control, sensory feedback, and information processing and resemble humans in appearance, behavior, and/or cognition.

Most robots include end of arm tooling (EOAT), otherwise known as end effectors, that interact with the work environment. End effectors may include impactive grippers such as jaws or claws that grasp an object by direct impact. End effectors may also include ingressive grippers such as pins or needles that penetrate the object such as that used in textile manufacturing. Furthermore, end effectors may include astrictive grippers that apply suction forces to the object.

Grasping by EOAT has been studied from various perspectives including planning, control, and learning. In real-world grasping, the full 3D shape of the object is hard to perceive and certain grippers are difficult to replicate with a physical model for study and grasp planning.

Several approaches have been successful in solving the problem of robotic grasping. For example, if the kinematics of the EOAT are known and a two-dimensional (2D) or three-dimensional (3D) model of the object is available, methods that consider form closure and force closure can be used to plan a grasp. Heuristic rules have been used to generate and evaluate grasps for three-fingered hands by assuming that the objects are made of basic shapes such as spheres, boxes, cones and cylinders, each with pre-computed grasp primitives. Other methods focus on grasping 2D planar objects using edges and contours to determine form closure and force closure. Further methods considered grasping planar objects by classifying them into a few basic shapes, and then used pre-scripted rules based on fuzzy logic to predict the grasp. Yet other methods used support vector machines to estimate the quality of a grasp given a number of features based on spin images. Closed loop feedback has also been used to perform grasps, both with visual feedback and tactile feedback. Most of these methods however assume a physical model of the gripper and often a very detailed physical model is required. In instances when the object geometry is known as well as the gripper geometry, control and planning algorithms are designed from the known geometric information for successful grasping with force closure and form closure.

Using learning algorithms to predict grasps have been used to provide a degree of generalization to grasping, thus making it applicable to previously unseen objects, as well as making it possible to add more features (as well as data) in order to increase the performance of the algorithm. It has been shown that a "grasping point" (where to grasp) can be estimated from an image of the object using a learning algorithm, and that the estimated grasping point can be generalized to a large number of novel objects. However, other parameters such as gripper orientation are not included and left to be estimated by other learning techniques.

Depth information, such as point cloud, has also been included to obtain higher performance. In addition, a segmented point cloud has been used to enable grasping in cluttered environments. In fact, learning algorithms have also been successfully applied to other object handling tasks such as placing an object in an unstructured environment and opening doors by turning door handles. These learning approaches show the possibility of interaction with the object without knowing the object geometry. However, these learning approaches are sub-optimal in that they only partly represent the gripper configuration by using low-dimensional representations such as a grasping point or pair of points.

There is a demand for predicting successful grasps for EOAT without requiring a physical model. Specifically, there is a demand for predicting the 3D location, 3D orientation and opening width or area of contact for an EOAT. The invention satisfies this demand.

SUMMARY OF THE INVENTION

Given an image and an aligned depth map of an object, the invention predicts the gripper orientation for an EOAT by defining a search space using a two-dimensional region in an image plane. The depth map is used to compute a disparity image for certain grippers or a 3D point cloud for other grippers such as a jamming gripper. For purposes of the invention, the term "gripper orientation" refers to the 3D location, 3D orientation and opening width of the gripper or area of contact of the gripper such as when a jamming gripper may be used. Specifically, the invention prunes the search space efficiently using certain features that are fast to compute and, if necessary, accurately selects a good grasp by using advanced features.

The invention uses a learning approach that examines an image of the object to predict a successful grasp without the requirement for a physical model. The use of a learning approach allows re-estimation of parameters to improve performance. This is particularly useful with jamming grippers in which physical models are difficult to develop due to the deformation a jamming gripper undergoes when contacting an object including how a deformable gripper shapes around an irregular object.

According to the learning approach of the invention, a 3D image of the object is examined by using a series of two-dimensional regions that match the size of the gripper and tests each one on a variety of features.

The invention formulates the problem as: given image/range data, predict a "representation" of the gripper configuration. Typically, this representation is a low-dimensional projection of the full gripper configuration (which is up to 7-dimensional for a two-fingered gripper) at the final grasping stage. A learning algorithm is used to predict a part of the gripper configuration while other dimensions are left to be estimated separately.

In one embodiment, the representation of the gripper configuration is an oriented rectangle from which the gripper configuration can be obtained. The rectangle, which is referred to as a "grasping rectangle", may represent one gripper configuration or a "set" of gripper configurations. The invention presents a two-step learning algorithm to efficiently learn this representation. Although the invention is described in reference to a rectangle shape, any shape is contemplated.

First, a certain class of features is described that makes the inference in the learning algorithm fast. Second, certain advanced features are described that are significantly more accurate but take more time to compute. Each step is learned using the Support Vector Machine (SVM) ranking algorithm. Specifically, the algorithm first learns a ranking function that maps a grasping rectangle represented by its feature vector to a score of the likelihood of a successful grasp using a SVM ranking algorithm. With the top results from the first step, a second classifier is run in a cascade that is more accurate (but slower) in order to find the top choice.

In one embodiment, the algorithm predicts the highest score grasp from a 2D image and its aligned depth map—either a disparity image or a point cloud. Specifically, 2D features are designed from the disparity image and the 3D features are designed from the point cloud. Filters and histograms such as fuzzy histograms are used to extract visual cues from the image. Depth is extracted from a disparity image. Normals and curvature at pixel level along with the Fast Point Feature Histogram are extracted from a point cloud.

Successful autonomous grasps can be predicted from the algorithm, which outperforms a baseline heuristic method that always attempts to grip an object at its center. Since the invention requires no physical model of the gripper, it can easily be applied to many other kinds of grippers, and assist in comparing grippers based on the types of objects each is best suited for handling. The invention successfully picks up a wide variety of objects (window wipers, wire strippers, shoes, etc.) even from categories not seen by the robot before.

Using a two-dimensional region such as a grasping rectangle explicitly models the physical size of the gripper, which cannot be captured using only a single point, or a pair of points. In addition, a grasping rectangle strictly constrains the boundary of features, i.e., the features are computed only from within the rectangle and the entire rectangle is used.

Over time, a library may be built that includes features common to good grasping rectangles. Presented with a new object, the rectangle with the highest score is chosen based on the rules previously discovered. Thus, if a rectangle is divided into three sub-rectangles and the center sub-rectangle is higher than the other two, the center may be a good place to grab. The learning approach of the invention also considers the overall size and shape of the object to choose a stable grasping point, e.g., a heavy, irregular object should not be picked up by one end.

The invention and its attributes and advantages may be further understood and appreciated with reference to the detailed description below of contemplated embodiments, taken in conjunction with the accompanying drawing.

DESCRIPTION OF THE DRAWING

The preferred embodiments of the invention will be described in conjunction with the appended drawings provided to illustrate and not to the limit the invention, where like designations denote like elements, and in which.

DETAILED DESCRIPTION OF THE INVENTION

The invention is described in reference to two types of end of arm tooling (EOAT)—a fingered gripper such as a two-fingered gripper or a three-fingered gripper and a jamming gripper. However, it is contemplated that the invention is applicable to any EOAT including a parallel plate gripper, jaws, etc.

A two-fingered or three-gingered gripper consists of phalanges that generally pinch the object. The invention determines the finger location, orientation and opening width of the gripper to successfully pick up an object. With a jamming gripper, the invention determines the location, orientation and area of contact with the object to successfully pick it up. A jamming gripper consists of a flexible membrane filled with a granular material. The jamming griper is able to quickly harden or soften to grip objects of varying shape by modulating the air pressure within the membrane. More specifically, as the membrane settles on an object it deforms to fit, then air is sucked out of the membrane, causing the granules to pull together and tighten the grip. Jamming grippers are advantageous in that they are capable of grasping objects of widely varying shape, harness, fragility, and texture, including multiple objects gripped at once.

Figure 1:
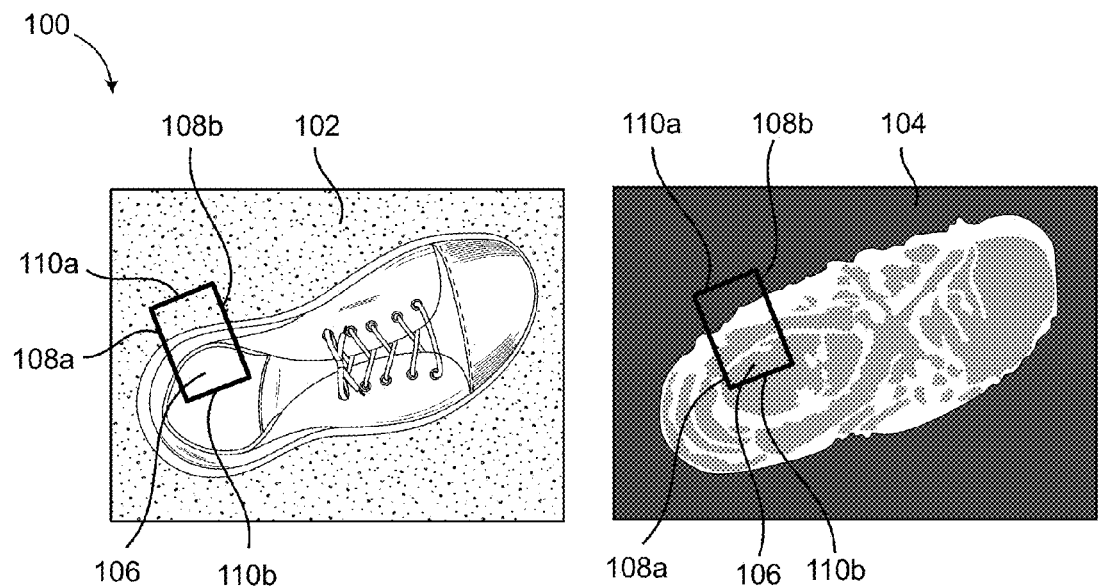
FIG. 1 illustrates images including a two-dimensional region according to one embodiment of the invention.

FIG. 1 illustrates images 100 including an oriented grasping rectangle from which a 7-dimensional grasping configuration can be obtained; the 7-dimensional grasping configuration taking into account the location, orientation and gripper opening width or area of contact. Given an image 102 and depth map (here, a disparity image) 104, the oriented rectangle 106 indicates not only where to grasp the object and the gripper's orientation, but also the gripper's opening width including closing direction 108a, 108b and its physical size 110a, 110b. Although one grasping rectangle is shown, multiple grasping rectangles may be valid. Again, the shape of a rectangle is used for illustrative purposes only—any shape is contemplated.

An image is taken along with an aligned depth map from one or more sensors such as a stereo camera. The depth map may be used to compute a disparity image or a 3D point cloud and vice versa. Specifically, an image I containing the object to be picked up is defined by length m and width n.

Figure 2:
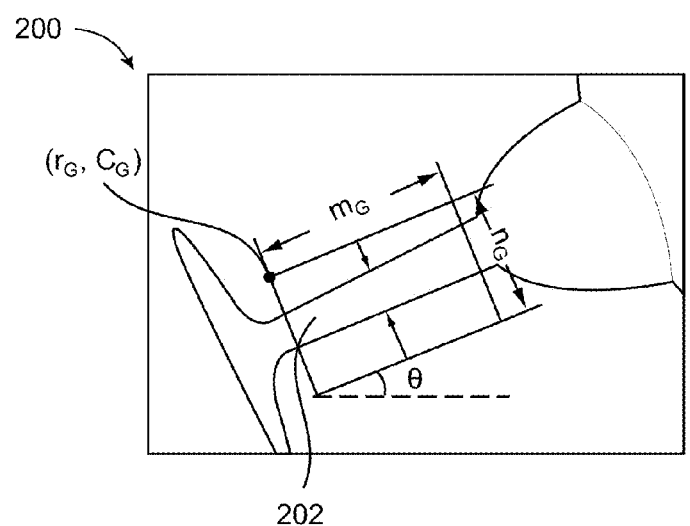
FIG. 2 illustrates the parameters that specify a two-dimensional region according to one embodiment of the invention.

As shown in FIG. 2, the grasping rectangle 202 is a 2D rectangle G uniquely specified by five parameters ($r_G, c_G, n_G, m_G, \theta_G$). The upper left corner of the grasping rectangle 202 is assigned a value $r_G, c_G$. The dimensions of the rectangle 202 are given by length $m_G$ and width $n_G$. The angle between the first edge and the x-axis is $\theta_G$. It should be noted that $r_G$, $c_G$, $m_G$, $n_G$, and $\theta_G$ are with respect to the image after rotating it by $\theta_G$ degrees. The grasping rectangle 202 is a full representation of the 7-dimensional gripper configuration. The center of the rectangle 202 is used to obtain the 3D position P from a point cloud. The width of the rectangle 202 is used to compute the gripper opening width. For 3D orientation, $\theta_G$ provides the rotation in the image plane (about the sensor axis). For the other two orientation angles, the configuration of the 3D points in the rectangle may be used. However, given only one view of the object, the normal to the image plane indicates a good direction to approach.

It is contemplated that the grasping rectangle may represent a "set" of grasping configurations rather than just one such as for robots with "thin fingers". For example, for a long object such as a pencil, the ground-truth label for the grasping rectangle would be a long rectangle aligned with the pencil and covering almost its full length. Any grasping configuration from this set would be a good grasp. A collection of grasps is more likely to capture the important features and patterns of a grasp than an individual pair of points.

According to the invention, the algorithm takes an image and an aligned depth map as input to obtain four feature values at each pixel including a depth value. To find the optimal grasping rectangle(s) in the image, a score function is defined which assigns a real number to each rectangle based on its features.

By computing incrementally the score and features of each rectangle, the search space is significantly reduced. However, a two-step process is used to prevent exclusion of some computationally more expensive features that more accurately capture the aspects of a good grasp. In the first step, features are used that allow incremental computation of the score function and to narrow down the search space from tens of millions down to a hundred rectangles. In the second step, more sophisticated features are used to refine the search and finally get the optimal rectangle. The first step is fast but inaccurate, while the second is accurate, but slow.

The score function is a linear function $f$ of the features within the rectangle G. Specifically, the score function is defined by:

$$f(G) = w^T \phi(G) = \sum_{i=1}^{k} w_i \phi_i(G) \quad \text{Equation (1)}$$

Again, the 2D rectangle is represented by G within the image I. The features within the rectangle G are represented by $\phi(G)$. Parameter w is the weight assigned to the rectangle based on Support Vector Machine (SVM) ranking algorithm.

In one embodiment, parameters for object features may be learned from images based on previous data. In another embodiment, parameters for object features may be computed manually. For example, a set of images may be ranked from "1" to "3". The invention considers more than one good grasp if available or a more desirable grasp over another. For example, a screwdriver may be grasped both by the handle or the shaft, however the handle is preferred due to its size and/or material composition. This makes the boundary between a good and bad grasping rectangle somewhat vague such that ranking different rectangles is more efficient.

Finding the highest-score rectangle is actually equivalent to the classic problem of finding the maximum-sum submatrix, for which several efficient algorithms exist. Thus, the problem can be solved efficiently if the score of the rectangle can be decomposed as a sum of scores of each pixel. The linear score function enables the score function to be decomposed as a sum of scores over the individual pixels.

If all the features satisfy $$\phi_i(G) = \sum_{(x,y) \in G} \phi_i(I(x,y)), \quad \forall i = 1, \ldots, k \quad \text{Equation (2)}$$

where $\phi_i(I(x,y))$ is the value of the feature i at pixel (x,y), then the score function can be calculated as follows:

$$f(G) = \sum_{i=1}^{k} w_i \phi_i(G)$$

$$= \sum_{i=1}^{k} \sum_{x=r_G}^{r_G+n_G} \sum_{y=c_G}^{c_G+m_G} w_i \phi_i(I(x,y))$$

$$= \sum_{x=r_G}^{r_G+n_G} \sum_{y=c_G}^{c_G+m_G} \sum_{i=1}^{k} w_i \phi_i(I(x,y))$$

$$= \sum_{x=r_G}^{r_G+n_G} \sum_{y=c_G}^{c_G+m_G} F(x,y)$$

New matrix F (of the same size as image I) in which F represents the score of pixel (x,y), i.e., $F(x,y) = \sum_{i=1}^{k} w_i \phi_i(I(x,y))$.

Thus, given matrix F, a rectangle (or submatrix) is found with the largest sum, i.e., finding the maximum-sum submatrix.

An incremental search algorithm is used to reduce the time complexity from $O(n^2m^2k)$ down to $O(n^2m)$. The score of each pixel, i.e., matrix F, is computed in time O(nmk). Therefore the overall time complexity is $O(nmk+n^2m)$, as long as all the features satisfy Equation (2).

As Equation (2) implies, features that are capable of accelerating the search are computed independently on each pixel. For instance, the sum of grayscale intensity values in the grasping rectangle is a possible feature, while the mean value is not. Similarly, histograms are a good source of such features because calculating a histogram of G equals the sum of the histogram of each pixel in G. Filters are used to capture the information of color, textures and edges. In one embodiment, six oriented edge filters and nine Law's masks are applied on the intensity channel, and two averaging filters are convolved on the two color channels respectively.

Figure 3:
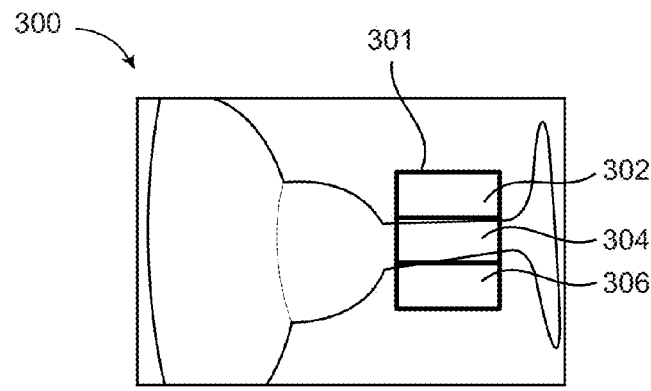
FIG. 3 illustrates a two-dimensional regions divided equally into two or more sub-regions according to one embodiment of the invention.

Although a histogram has the potential to describe the overall distribution in the rectangle, it is not always good at finding patterns at different parts of the grasping rectangle. As shown in FIG. 3, a grasping region 301 on the image 300 of a glass is evenly divided into horizontal, sub-regions 302, 304, 306 with each sub-region having its own unique pattern. Grasping the glass at the middle part of the grasping region 301 (i.e., 304) should be the stem and the two sides should be the background. This corresponds to a depth map where the middle sub-region 304 has closer depths than the sides.

As shown in FIG. 3, the grasping region 301 is divided equally into two or more sub-regions 302, 304, 306 and the features are computed for each sub-region 302, 304, 306 separately. Although the region 301 is divided equally, it is contemplated that the region can be divided unequally. Weights are obtained for each sub-region, here $w_1$ for sub-region 302, $w_2$ for sub-region 304, $w_3$ for sub-region 306. A score for the grasping region is calculated by adding the weights for each sub-region.

Figure 4:
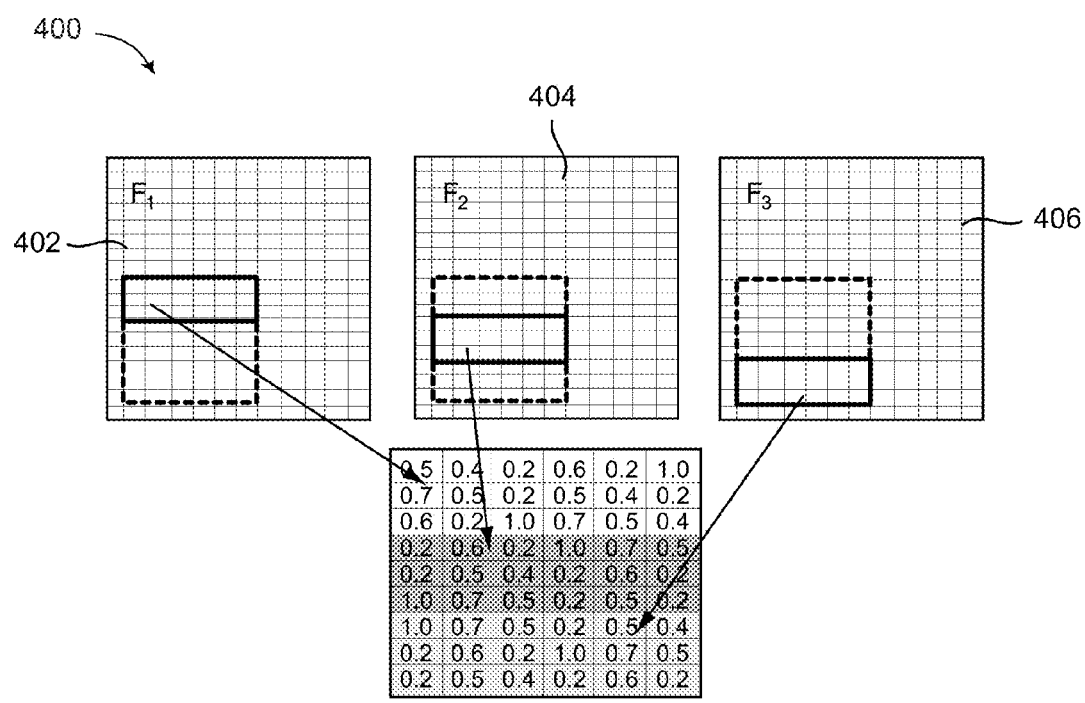
FIG. 4 illustrates matrices of each sub-region according to one embodiment of the invention.

FIG. 4 illustrates matrices 400 of each sub-region as shown in FIG. 3. Instead of having one matrix F, three matrices $F_1$, $F_2$ and $F_3$ are used these to compute the score of each sub-region separately, as shown in FIG. 4. After tripling the feature space the time complexity still remains $O(nmk+n^2m)$.

While histogram features are good for fast pruning of the grasping region, more powerful features are needed for estimating the grasping rectangle accurately. In particular, features that capture the correlations between the three sub-regions are needed. For example, one possible relation is that the average depth of both the top sub-region 302 (FIG. 3) and bottom sub-region 306 (FIG. 3) should be larger than that of the middle one 304 (FIG. 3). Assuming the three mean depths of the three sub-regions are $d_1=d+\Delta d$, $d_2=d$, and $d_3=d+\Delta d$ and using the histogram features, the resulting model will have negative and positive $w_1$ and $w_3$, meaning that regions with large $d_1$ and $d_3$ and small $d_2$ are preferred. However, it will also assign a high score to a region with small $d'_1=d$, $d'_2=d$ but much larger $d'_3=d+2\Delta d$ (e.g., a rectangle not lying on the stem of the martini glass), since the score from $d_3$ and $d_1$ are additive. Therefore, it is better to use the criterion $d_1>d_2$ and $d_3>d_2$. However, because the depths are noisy such hard constraints cannot be relied upon. Therefore, non-linear features such as $d_{nl}=d_1d_3/d_2^2$ are used.

In embodiments where successful grasps are desired for an EOAT that is a jamming gripper, fuzzy histograms are preferred over normal histograms since values near boundaries can be extremely sensitive to noise. To address this issue, fuzzy histograms are calculated based on (linear) fuzzy partitions. For each bin i, a bin center $c_i$ is defined and each input value X is allocated to bins i such that $c_i < x < c_{i+1}$ in the manner that bin i receives $$1 - \frac{x - c_i}{c_{i+1} - c_i}$$

and bin i+1 receives $$\frac{x - c_i}{c_{i+1} - c_i}.$$

In this way, small changes in x would only cause a commensurate change in the fuzzy histogram.

Figure 5:
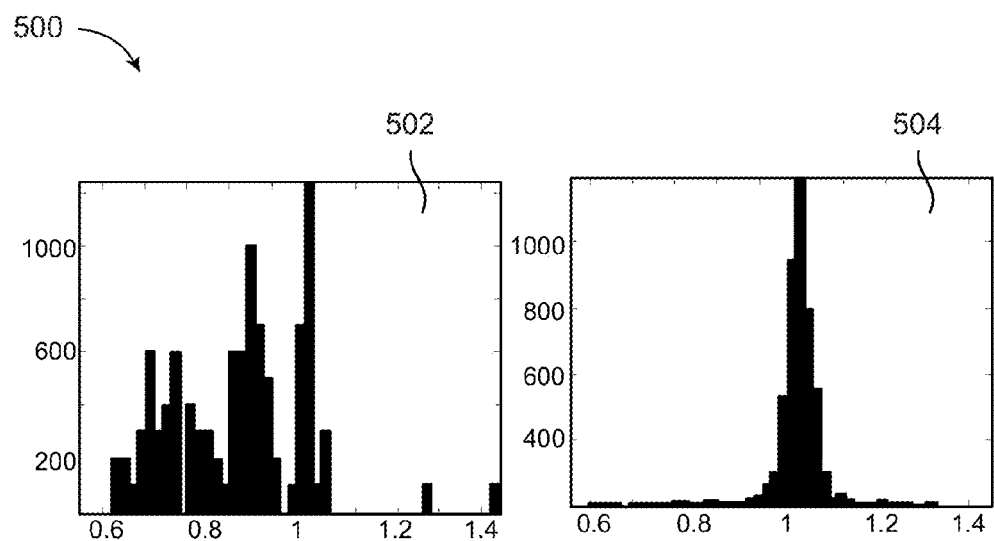
FIG. 5 illustrates histograms of non-linear features according to one embodiment of the invention.

To verify that this feature can help distinguish grasping rectangles, histograms are plotted as shown in FIG. 5. Plot 502 illustrates a histogram of positive examples of feature $d_{nl}=d_1d_3/d_2^2$. According to plot 502, the x-axis value is the depth of the non-linear feature $d_{nl}$ and the y-axis value is the number of positive rectangles with values almost distributed from 0.5 to 1. Plot 504 illustrates a histogram of negative examples of feature $d_{nl}=d_1d_3/d_2^2$. According to plot 504, the x-axis value is the depth of the non-linear feature $d_{nl}$ and the y-axis value is the number of negative rectangles with the distribution of values centered around 1. Thus, the histogram plots 502, 504 coincide with the fact that for a true grasping rectangle $d_1d_3/d_2^2$ is more likely to be less than 1.

Based on the existing features from the histograms, more advanced features are used to improve the model by making a more accurate prediction on the ranks of the grasping regions. Each sub-region 302, 304, 306 (FIG. 3) includes values denoted by $\phi_T$, $\phi_M$, $\phi_B$, respectively. Therefore, for advanced features, the following are added $\phi_T/\phi_M$, $\phi_B/\phi_M$, and $\phi_T\phi_B/\phi_M$, as well as the mean and median from the depth map to get a new total number of features. Similar to the features described above, the advanced features are searched and ranked using a SVM ranking algorithm.

With a point cloud, the normal vector and curvature is calculated at every point by fitting a surface through the point and its neighboring points. Ignoring the x-position, y-position and normal information, the z-position along with the surface normal in the z-direction and the local curvature is used to apply the equal division of the grasping rectangle. In order to derive more geometric information from the point cloud, the Fast Point Feature Histogram (FPFH) signature for every point is calculated. FPFH are informative pose-invariant local features that represent the underlying surface model properties at each point. They are computed based on certain geometric relations between a point and its neighbors. In one embodiment, a 33-bin FPFH is calculated for each pixel and the FPFH signature for a rectangle is defined as the sum of FPFH from all pixels within the rectangle. Using the point cloud, this representation is converted to the gripper configuration and the grasp is executed.

The number of total features is determined by the number of filters, number of sub-regions and number of intervals (bins) of the histrograms. For example, using 17 filters and 5-bin histograms for each of the three sub-rectangles provide a total of 255 total features (17×5×3). As another example, using 17 filters and 15-bin histograms for each of the three sub-rectangles provide a total of 765 image features (17×15×3).

Figure 6:
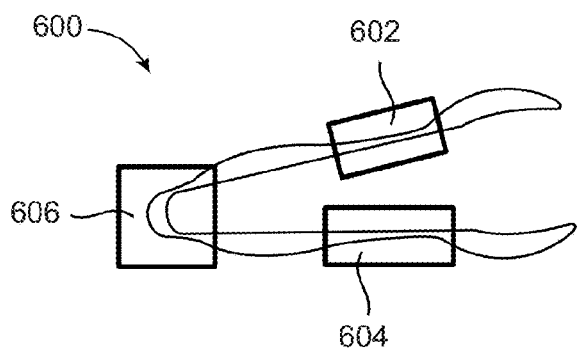
FIG. 6 illustrates examples of grasping rectangles according to one embodiment of the invention.

FIG. 6 illustrates examples of grasping rectangles according to one embodiment of the invention. Specifically, image 600 includes grasping rectangles 602, 604 that illustrate successful grasps for grippers such as a two-fingered or three-fingered gripper and grasping rectangle 606 illustrate a successful grasp for a jamming gripper.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for determining a successful grasping configuration of an object by an end of arm tooling, comprising the steps of:
   receiving from one or more sensors an image of an object, wherein the image includes an aligned depth map;
   defining two or more two-dimensional regions on the image, wherein each region includes a plurality of pixels;
   dividing each region into two or more sub-regions;
   computing features for each pixel within each sub-region to obtain a weight for each sub-region;
   adding the weight for each sub-region to obtain a score for each region of the two or more two-dimensional regions on the image;
   ranking each region based on the score for each region to obtain a rank for each region; and
   selecting the region with the highest rank, wherein the region with the highest rank conveys a successful grasping configuration of the object by an end of arm tooling.

2. The method of claim 1, wherein the aligned depth map is a disparity image.

3. The method of claim 1, wherein the aligned depth map is a point cloud.

4. The method of claim 1, wherein the two-dimensional region is in the form of a rectangle shape.

5. The method of claim 1, wherein the features for each pixel comprises one or more selected from the group of: color information, texture information, and edge information.

6. The method of claim 1, wherein the features for each pixel are captured by one or more filters.

7. The method of claim 1, wherein each region is divided equally into two or more sub-regions.

8. The method of claim 1, wherein the receiving step further comprises the step of normalizing the image to reduce illumination changes caused by different lighting conditions.

9. The method of claim 1, wherein the ranking step is performed by a Support Vector Machine (SVM) ranking algorithm.

10. The method of claim 1, wherein the score is a real number.

11. The method of claim 1, wherein the end of arm tooling is a jamming gripper.

* * * * *